(12) United States Patent
Haddad et al.

(10) Patent No.: US 11,421,605 B2
(45) Date of Patent: Aug. 23, 2022

(54) OUTLET FOR EJECTING A HOT GAS THROUGH AN AIRCRAFT ENGINE WALL

(71) Applicants: SAFRAN AIRCRAFT ENGINES, Paris (FR); SAFRAN ELECTRONICS & DEFENSE, Boulogne-Billancourt (FR)

(72) Inventors: Christian Haddad, Moissy-Cramayel (FR); Daniel De Barros Soares, Moissy-Cramayel (FR); Claude Pierre Joannès Dupin, Moissy-Cramayel (FR); Bastien Pierre Verdier, Moissy-Cramayel (FR)

(73) Assignees: SAFRAN AIRCRAFT ENGINES, Paris (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 7 days.

(21) Appl. No.: 17/271,436

(22) PCT Filed: Aug. 19, 2019

(86) PCT No.: PCT/FR2019/051933
§ 371 (c)(1),
(2) Date: Feb. 25, 2021

(87) PCT Pub. No.: WO2020/043977
PCT Pub. Date: Mar. 5, 2020

(65) Prior Publication Data
US 2021/0189974 A1 Jun. 24, 2021

(30) Foreign Application Priority Data
Aug. 30, 2018 (FR) ...................... 18 57822

(51) Int. Cl.
*F02C 9/18* (2006.01)
(52) U.S. Cl.
CPC .......... *F02C 9/18* (2013.01); *F05D 2220/323* (2013.01); *F05D 2270/303* (2013.01)
(58) Field of Classification Search
CPC . F02C 9/18; F05D 2220/323; F05D 2270/303
See application file for complete search history.

(56) References Cited

U.S. PATENT DOCUMENTS

| 5,269,135 A | 12/1993 | Vermejan et al. |
| 2006/0266051 A1* | 11/2006 | Gukeisen ................ F16K 1/126 60/785 |

(Continued)

FOREIGN PATENT DOCUMENTS

| EP | 1 728 992 A2 | 12/2006 |
| EP | 2 275 655 A2 | 1/2011 |
| FR | 3 015 569 A1 | 6/2015 |

OTHER PUBLICATIONS

International Search Report dated Dec. 6, 2019 in PCT/FR2019/051933 filed on Aug. 19, 2019, 2 pages.

(Continued)

*Primary Examiner* — Shafiq Mian
(74) *Attorney, Agent, or Firm* — Oblon, McClelland, Maier & Neustadt, L.L.P.

(57) ABSTRACT

A duct for evacuating hot air from an aircraft engine is extended by a movable stack that can project from the wall such that the hot air is ejected a distance from the wall without risk of damaging the wall. The stack can, however, be retracted by a control device under circumstances of moderate engine speed, with the advantage that the drag of the wall, generally an outer nacelle, is then reduced.

11 Claims, 4 Drawing Sheets

(56) References Cited

U.S. PATENT DOCUMENTS

| | | |
|---|---|---|
| 2011/0011477 A1 | 1/2011 | Mullender et al. |
| 2016/0231068 A1* | 8/2016 | Schmitz ................ F28F 9/0265 |
| 2018/0051716 A1* | 2/2018 | Cheung .................. F04D 25/06 |
| 2018/0258859 A1* | 9/2018 | Suciu ...................... F02K 3/115 |

OTHER PUBLICATIONS

Preliminary French Search Report dated Apr. 18, 2019 in French Application No. 18 57822 filed on Aug. 30, 2018, 1 page.

* cited by examiner

OUTLET FOR EJECTING A HOT GAS THROUGH AN AIRCRAFT ENGINE WALL

The invention relates to an outlet for ejecting a hot gas through an aircraft engine wall.

It can be used at the end of hot gas ducts of aircraft engines, which belong to heat exchange circuits drawing cool gas (usually air) from a relatively cool region of the aircraft, like the secondary flow path when it exists or the compressors of the main flow path, before being subjected to heating in a heat exchanger with a hotter portion of the engine that should be cooled, or another fluid (lubricating oil or gas for example). The gas that has become hot is then released into an outer environment through an outlet, also called an ejection grating, made of one or more openings passing through a wall of the aircraft, such as an outer nacelle cowl or an outer or inner stator casing.

It happens that the hot gas is rejected at a temperature higher than that which can be tolerated without damage by the material of the wall, that the hot gas washes before being dispersed and which therefore undergoes degradation around the openings of the ejection grating.

An example of such an outlet, possibly subject to this difficulty, can be found in document FR 3 015 569 A.

This risk of damage can be avoided by imposing early detachment of the hot gas, in order to keep it away from the wall near the outlet. The flow of a cooler gas that normally circulates on the outer face of the wall during engine operation by maintaining a protective layer is exploited. The hot gas undergoes rapid mixing with the cool gas, and becomes harmless before it can return to the wall.

This effect can be provided by parts called stacks, which are placed on the openings while projecting out of the wall into the cool ejection environment, and therefore release the hot gas at a distance from the wall, on which the protective layer of cool ambient gas is maintained during flight.

Stacks can be aerodynamically profiled in order to have reduced drag, but that is not possible to remove completely. One disadvantage of projecting stacks is therefore a reduction in the efficiency of the engine.

The invention is based on the idea that the protection of the wall of the nacelle is not necessary throughout the duration of the flight, but only in some particular situations thereof, when the engine is running at full speed, while it is not in cruising mode, where the flow rate of hot gas is almost zero. Therefore, the idea was to take into account these different conditions at different flight speeds to adapt the design of the ejection device.

The object of the invention is to vary the height of the projection of the stacks above the wall of the engine according to the circumstances and in particular the flight speed, mainly to reduce this height of projection and the corresponding drag as soon as it is possible.

EP 2 275 655 A2 describes such a deployable stack, whose wall is provided with openings to ensure a larger operating surface when the flow rate to be discharged increases. The deployment of the stack depends on an increase in the pressure drop required to pass therethrough, produced by the increase in flow rate.

EP 1 728 992 A2 describes an inlet valve of a circuit for sampling gas circulating in a flow path, whose rising height in the flow path is variable to open the valve more or less.

In general form, the invention relates to an ejection outlet of the above type, and comprising at least one opening through the wall, a duct for conveying the hot gas leading to the opening, and a stack associated with the opening and in the shape of a sleeve projecting out of the wall, where the stack is detached from the wall, movably engaged through the opening, and provided with a movement control device varying a height of the projection of the stack out of the wall.

And the control means does not depend on an outer action, originating from another system or imposed by an operator such as the pilot of the aircraft, but an automatic control is on the contrary applied. It comprises a motor means sensitive to a temperature, for deploying or retracting the stack according to the temperature which is measured or felt.

The invention can be applied to a single-opening outlet. However, the usual devices comprise a plurality of such openings constituting an ejection grating, each of which is provided with a stack as mentioned above. It is therefore in accordance with a preferred embodiment of the invention for the devices for controlling the movement of the stacks to be independent of each other, in order to limit the consequences of a possible malfunction to only one of the openings.

According to one embodiment mainly considered, the stack is cylindrical, and the control device is arranged to impose thereto a translational movement perpendicular to the wall by sliding in the opening: the corresponding devices are particularly simple to design and construct.

The term "cylindrical" used in this application encompasses all forms of solid delimited by a surface whose generators are parallel and by two end surfaces. Thus, the cylindrical stack can have a circular, elliptical or even any section.

According to a second embodiment, the stack has a rectangular section.

A temperature measurement can be made by a sensor such as a thermocouple positioned on the surface of the nacelle cover, which controls a power supply circuit of a motor actuating the control device. But a device without a characterised motor would also be advantageous: it could consist of an inert actuator of the movement of the stack, capable of undergoing a change of state according to a temperature. The temperatures mentioned above are representative temperatures of the assumed heating of the wall. They may consist of the temperature of the wall, in particular downstream of the hot gas ejection outlet, or the temperature of the gas in the duct.

Security can be provided by a means for returning the stack to a fully deployed position, that is to say at the height of the maximum projection out of the wall, in the event of inactivity or failure of the control device. The return means then maintains the stack in the state where it best protects the wall by preventing the fall of hot gas thereon.

Advantageously, the stack can have a fully retracted position under the wall, therefore corresponding to a zero projection height, in order to minimise the drag.

Finally, it is still advantageous, to allow simplified control, that the movement of the stack is tilting between two stable positions, according to the crossing of a temperature threshold, that is to say that the stack is either fully deployed, or fully retracted, the intermediate states are not necessarily interesting.

But more generally, the height of the projection of the stack can be determined by the flight speed of the engine of the aircraft; with high height at high take-off or acceleration speeds for example, and little or zero height at low speeds, for example cruising.

The various aspects, features and advantages of the invention will be kept described in more detail, by means of the following figures, which illustrate some embodiments thereof given purely by way of illustration:

FIG. 1 illustrates the disappearance of an ejection grating on an aircraft engine;

FIG. 2 schematically shows the ejection flow;

Figure 8:
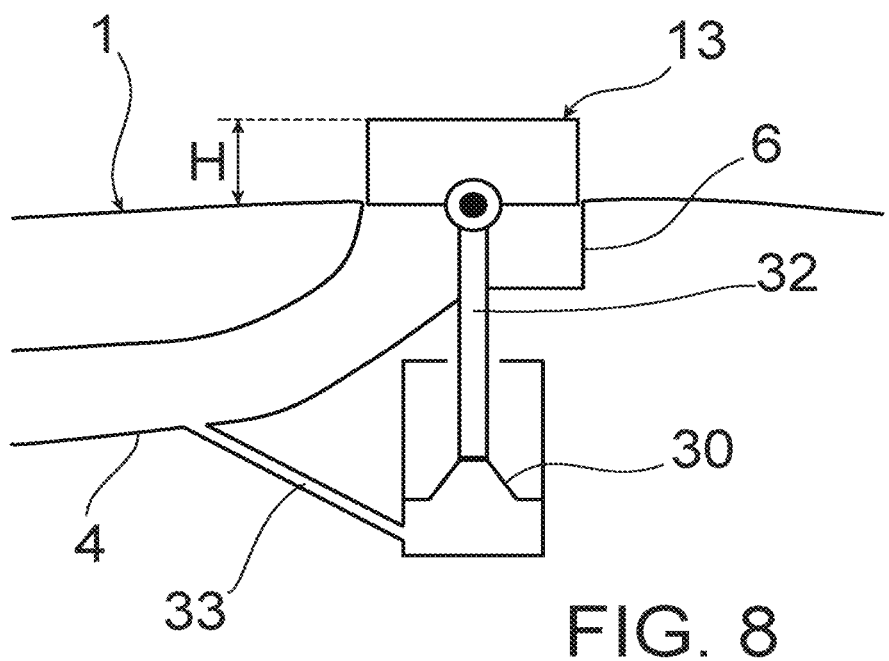
Figure 9:
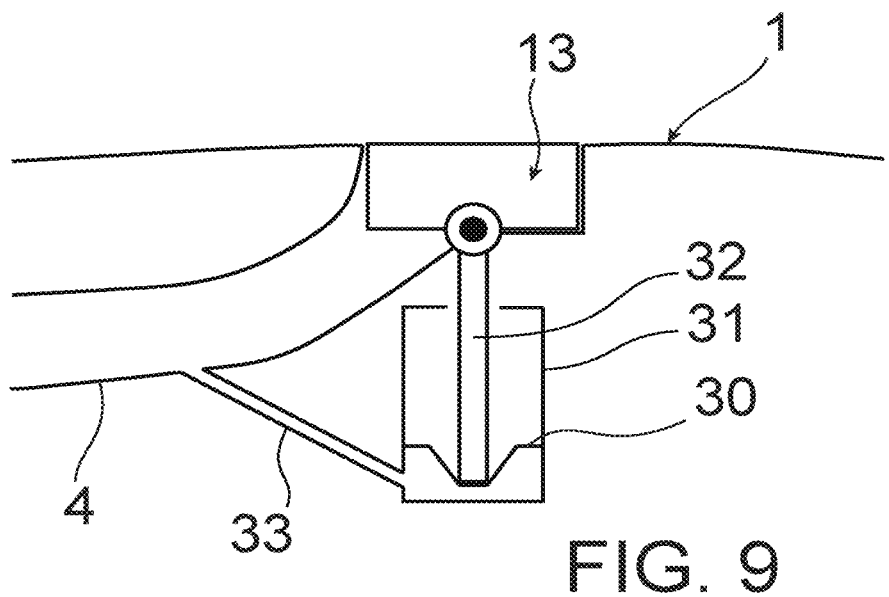

and FIGS. 8 and 9 illustrate a second embodiment of the invention with two operating states.

Figure 1:
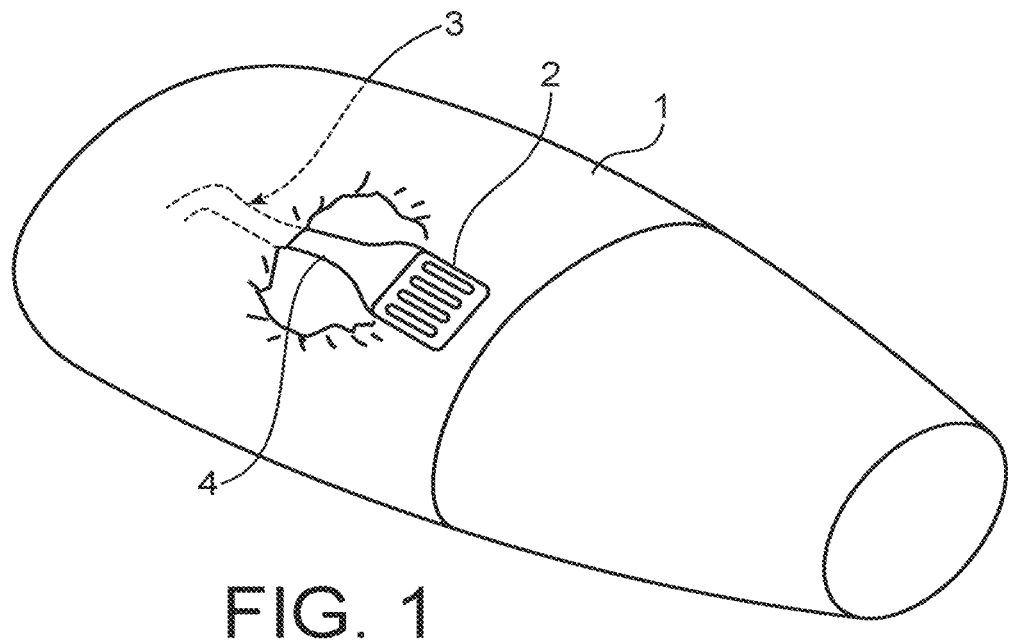

FIG. 1 schematically shows a nacelle cowl surrounding an aircraft engine, the wall 1 of which is provided with an outlet 2 through which a heat exchange circuit 3 located under the wall 1 opens outside said wall, and ejects a gas jet previously withdrawn from another part of the engine and having participated in a heat exchange. It is recalled that the invention is not limited to a use on a nacelle cowl, but that it can also relate to other cowls, such as those of external or internal stator casings. Likewise, the heat exchange circuit 3 can originate from various places in the engine, its path is also not imposed and the heat exchange allows to cool another fluid which is also indifferent.

Figure 2:
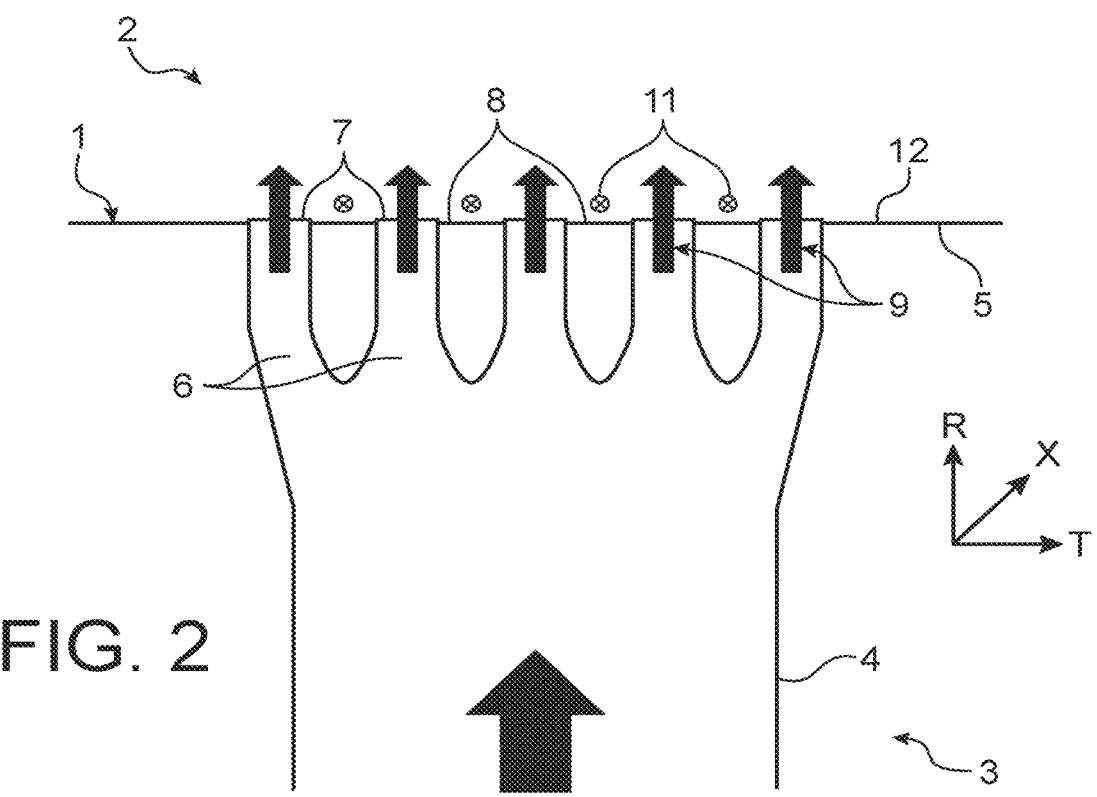

Reference is made to FIG. 2. The heat exchange circuit 3 includes at its downstream end a pipe 4 which extends under an inner face 5 of the wall 1. Approaching the latter, the pipe 4 is divided into branches 6, here distinct from each other, then parallel and with a section first decreasing, then uniform, before reaching the wall 1 and the outlet 2; and the branches 6 are connected to the wall 1, and communicate to the outside of the latter, through many openings 7 of the outlet 2, which pass through the wall 1. Their disposition is better visible in FIG. 3. The openings 7 are parallel to each other, follow one another in a transverse direction T (often the angular direction of the engine), and their shape is oblong, their largest dimension being in a longitudinal direction or a direction of main elongation X, perpendicular to the previous one on the wall 1 (often the axial direction of the engine). The length of the openings 7 in the direction X can be comprised between 100 mm and 450 mm; the width of the openings 7 in the direction T may be comprised between 5 mm and 30 mm; that of the ejection grating formed by the outlet 2 between 250 mm and 600 mm; and the total area of the outlet 2 can vary between approximately 0.01 m2 and 0.25 m2. However, there is no real dimensional limit to the application of the invention. And the openings 7 are separated by lamellae 8 of the wall 1, the width of which may be comprised between 0.5 times and 3 times the width of the openings 7, preferably 1.0 times.

The hot gas, often air, which is ejected by the circuit 3 is therefore divided into hot streams 9 which respectively take the branches 6. Their direction may first be in the direction of height R (perpendicular to the two previous ones X and L, and often coinciding with the radial direction of the engine) by rising below the outer face 12, opposite the inner face 5, of the wall 1, before being inflected and taking a movement component in the longitudinal direction X under the effect of an external flow 10 tangent to the wall 1 (often directed downstream of the engine) of a cool gas (often ambient air). But the flow 10 is divided into cool streams 11, passing around the openings 7 and over the lamellae 8, passing over the outlet 2, with a significant flow rate which remains tangent to the wall 1. This flow rate of cool gas thwarts the return of the hot streams 9 on the outer face 12 of the wall 1 and protects it from overheating. In addition, dividing the hot and cool flows into intertwined streams 9 and 11 promotes their faster mixing and therefore the elimination of hot areas outside the outlet 2.

Figure 4:
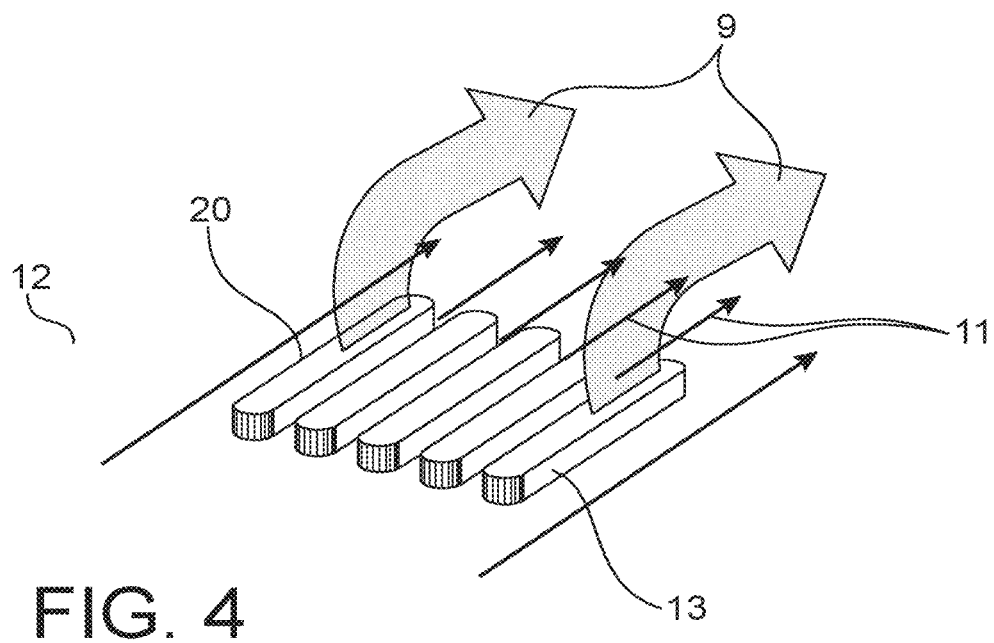
FIG. 4 illustrates the effect of stacks at the openings of the grating.

FIG. 4 shows a possible arrangement of a stack ejection grating, wherein the openings 7 and the branches 6 of the circuit are extended by stacks 13 projecting on the outer face 12 of the wall 1. The height of the stacks 13 can typically be a few millimetres or a few centimetres with this disposition. The hot streams 9 exit the heat exchange circuit 3 at a distance from the wall 1 through an upper edge 20 of the stacks 13, which helps to maintain the cool air streams between the openings 7.

Figure 3:
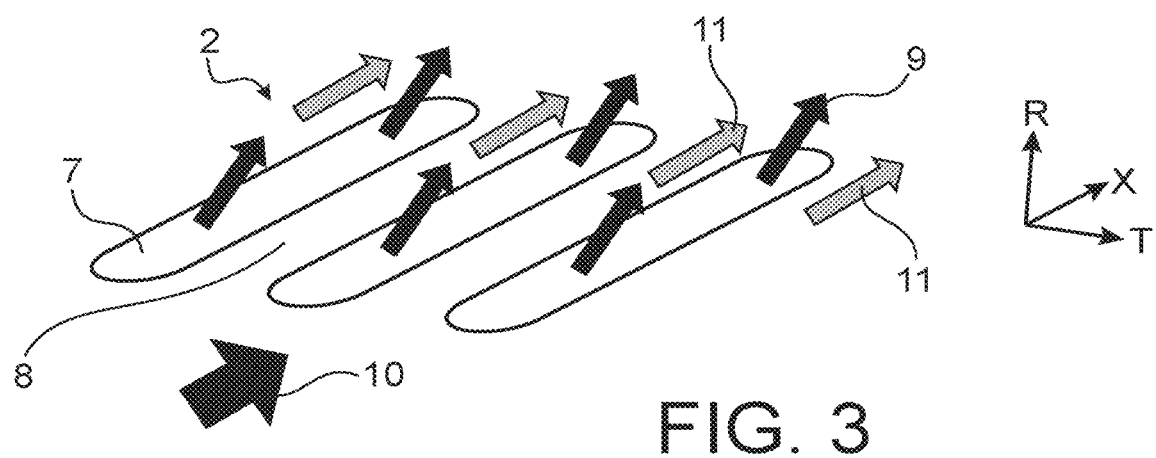
FIG. 3 shows the gas flows at the grating.
Figure 5:
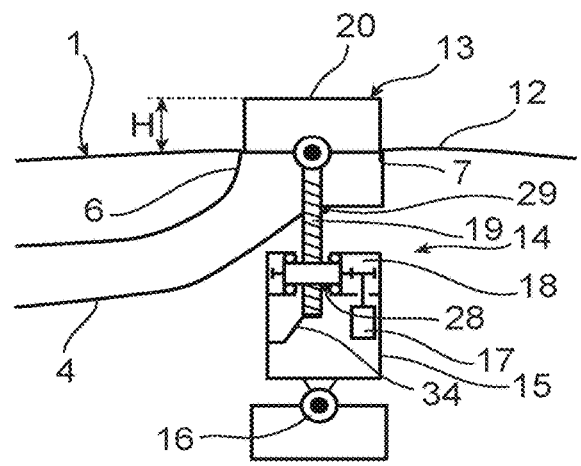
FIGS. 5 and 6 illustrate a first embodiment of the invention with two operating states.
Figure 6:
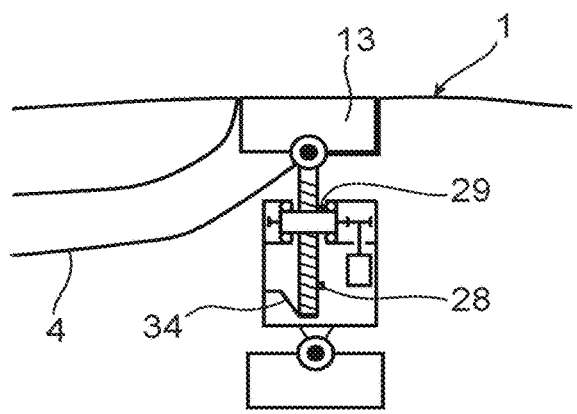

The description now relates to FIGS. 5 and 6. The stacks 13 are not fixed to the engine structure and in particular to the wall 1, but on the contrary are detached therefrom, and each consists of a sleeve of cylindrical shape, that is to say with a constant section, identical to that of the opening 7 except for a small clearance, engaged through the opening 7. Their section may be rectangular, with in particular two long straight and parallel sides in the axial direction X as shown in FIG. 3, and two short rounded sides. Their wall is continuous, devoid of any opening. In addition, they are movable. Their movement is advantageously sliding and accomplished by a control device 14 comprising, in a housing 15 articulated at a fixed point 16 of the structure of the aircraft engine, an electric motor 17, movement transmission gears 18, and a worm 19 meshing with the transmission 18, perpendicular to the wall 1 and articulated to the stack 13.

The control device 14 imposes on the stack 13 a translational movement in the direction of the worm 19 which has the effect of making it slide in the branch 6 by varying its height of projection H above the outer face 12 between a maximum value, corresponding to a fully deployed position shown in FIG. 5, and a minimum value wherein the height of the projection can moreover be zero, that is to say that the stack 13 is then fully retracted in branch 6 and the outer face 12 is smooth (FIG. 6). The first position is used when the wall 1 is subjected to very high temperatures during the ejection of very hot gas, while the second position is used in other circumstances, when the cooling needs of the aircraft engine are lower and the hot gas flow is reduced, or the gas is at a lower temperature. The opening section of the stack 13 is identical in the two states, and must be sufficient to evacuate all the predictable gas flows without opposing a significant pressure drop.

Figure 7:
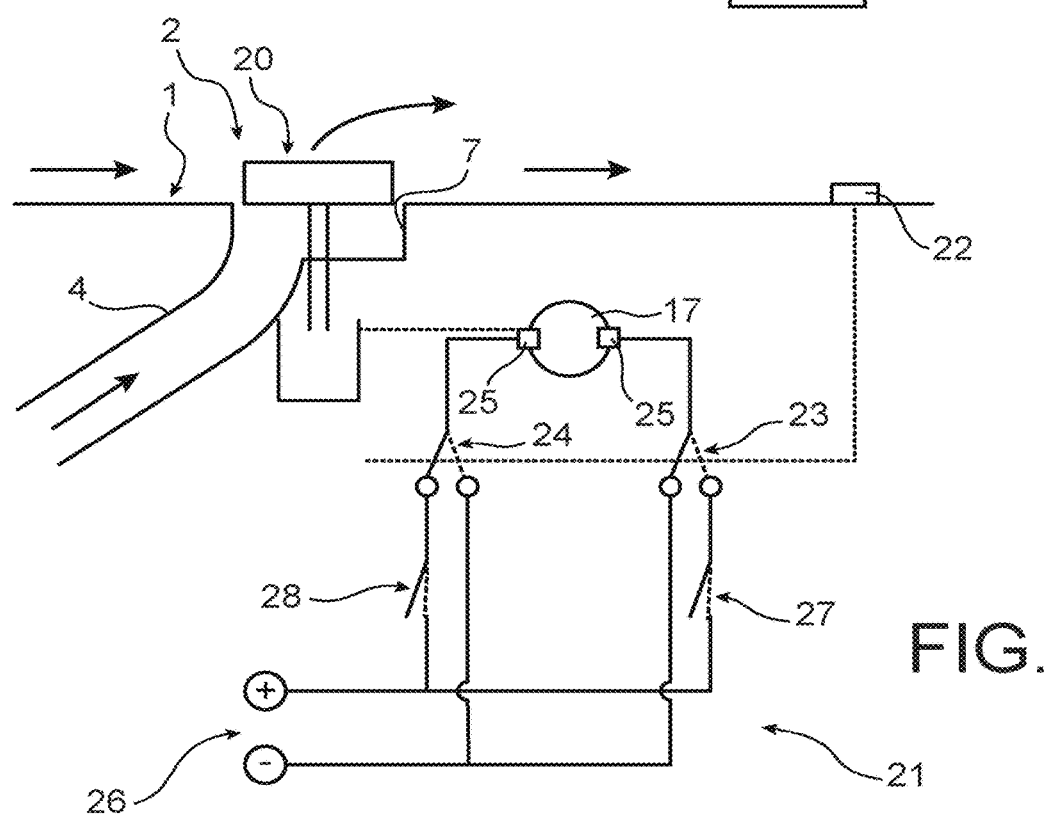
FIG. 7 shows a device for controlling the movement of the stack.

The control device 14 can be controlled by the means shown in FIG. 7, comprising an electrical circuit 21 or a thermocouple 22, which is a temperature sensor positioned (for example) on the outer face 12 of the wall 1 downstream of the openings 7 of the outlet 2, controls two switches 23 and 24 able to place the terminals 25 of the electric motor 17 at either one of the positive or negative poles of a constant potential difference 26. The electric circuit 21 therefore allows the electric motor 17 to be rotated in one direction or the other. Switching is made when the thermocouple 22 detects that a temperature of the wall 1 becomes higher or lower than a threshold value.

The electric circuit 21 is completed by end-of-stroke contacts 27 and 28 established at the terminals of the motor 17 and which open the electric circuit 21 to stop the movement when a limit is reached. A device which is purely passive in that it does not impose any outer control, but which is simple and reliable is obtained. And this device is bi-stable between the fully deployed position and the fully retracted position, which is satisfactory because the intermediate deployments are uninteresting in this application, and allows to safeguard the robustness of the device.

Another control device 29, having some similar properties but of even simpler constitution, is described by means of FIGS. 8 and 9. It comprises a deformable structure 30 mounted to a fixed structure 31 of the engine, and carrying a smooth rod 32 replacing the worm 19 and carrying the stack 13. The deformable structure 30 is bi-stable between two states where it has different shapes, therefore imposing two different deployment positions on the stack 13 as above. The deformable structure 30 can be constructed from a thermostat bimetal made of a shape memory alloy. Switching from one state to another can be controlled (for example) by the temperature of the hot gas, the deformable structure 30 being exposed to this gas by a communication duct 33 leading into the duct 4.

A significant gain in fuel consumption by the engines equipped with the invention has been observed, thanks to the possibility of retracting the stacks 13 in most flight speeds, despite the increase in weight imposed by the control devices 14. The reliability of the latter is good thanks to their robustness. It is moreover possible, in some designs, to add a return device (34 in FIGS. 5 and 6) in the shape of a spring which tends to displace the stack 13 to its fully deployed position, which is therefore a safety position preventing in all circumstances damage to the wall 1. The force of the spring 34 can however be overcome by the motor 17, so that the operation of the device is not impeded and that the fully deployed position is forced only in the event of any damage or inactivity of the control device (engine failure or damage to the transmission 18 for example). The connection between the transmission 18 and the worm 19 must then be kinematically reversible.

In the usual case of a plurality of openings 7, each is advantageously controlled by an independent device similar to those which have been described, so that a failure of one of them remains localised at the corresponding opening 7.

In general, the means for triggering the deployment and retraction of the stack, which are sensitive to the crossing of certain temperature thresholds, can be either sensors which measure a temperature and send the measurement to a control device, or the stack actuators themselves, which are built to change state based on temperature.

The invention claimed is:

1. An outlet for ejecting a hot gas through an aircraft engine wall, an outer face of the wall being exposed to a flow of a cooling gas, the flow being tangent to the wall, the outlet comprising at least one opening through the wall, a duct for conveying the hot gas extending under an inner face of the wall and leading to the opening, and a stack associated with the opening and in the shape of a sleeve projecting out of the wall, the sleeve being comprised of a sleeve wall which is continuous, the sleeve being open at an upper edge above the wall, wherein the stack is detached from the wall, movably engaged through the opening, and provided with a movement control device varying a height of the projection of the stack out of the wall, and wherein the control device comprises a motor means sensitive to a temperature, to the exclusion of any voluntary control.

2. The ejection outlet according to claim 1, wherein the control device comprises a sensor of said temperature, and an electric motor controlled by the sensor.

3. The ejection outlet according to claim 1, wherein the motor means comprises an inert actuator changing state according to a temperature.

4. The ejection outlet according to claim 1, wherein the temperature is either a temperature of the wall downstream of the opening, or a temperature of the hot gas in the duct.

5. The ejection outlet according to claim 1, further comprising a means for returning the stack to a fully deployed position at maximum height of projection out of the wall, in case of inactivity or failure of the control device.

6. The ejection outlet according to claim 1, wherein the movement is tilting between two stable positions of the stack, according to the crossing of a temperature threshold of the wall or of the hot gas in the duct.

7. The ejection outlet according to claim 1, wherein the stack has a continuous wall, devoid of openings.

8. The ejection outlet according to claim 1, wherein the stack is cylindrical, and the control device is arranged to impose thereto a translational movement perpendicular to the wall by sliding in the opening.

9. The ejection outlet according to claim 1, wherein the stack is movable with a fully retracted position under the wall, at zero projection height.

10. The ejection outlet according to claim 1, comprising a plurality of said openings each provided with a said stack and distributed over the wall, wherein the stack movement control devices are independent of each other.

11. The ejection outlet according to claim 1, wherein the height of the projection varies depending on the speed of flight of the aircraft.

* * * * *